UNITED STATES PATENT OFFICE.

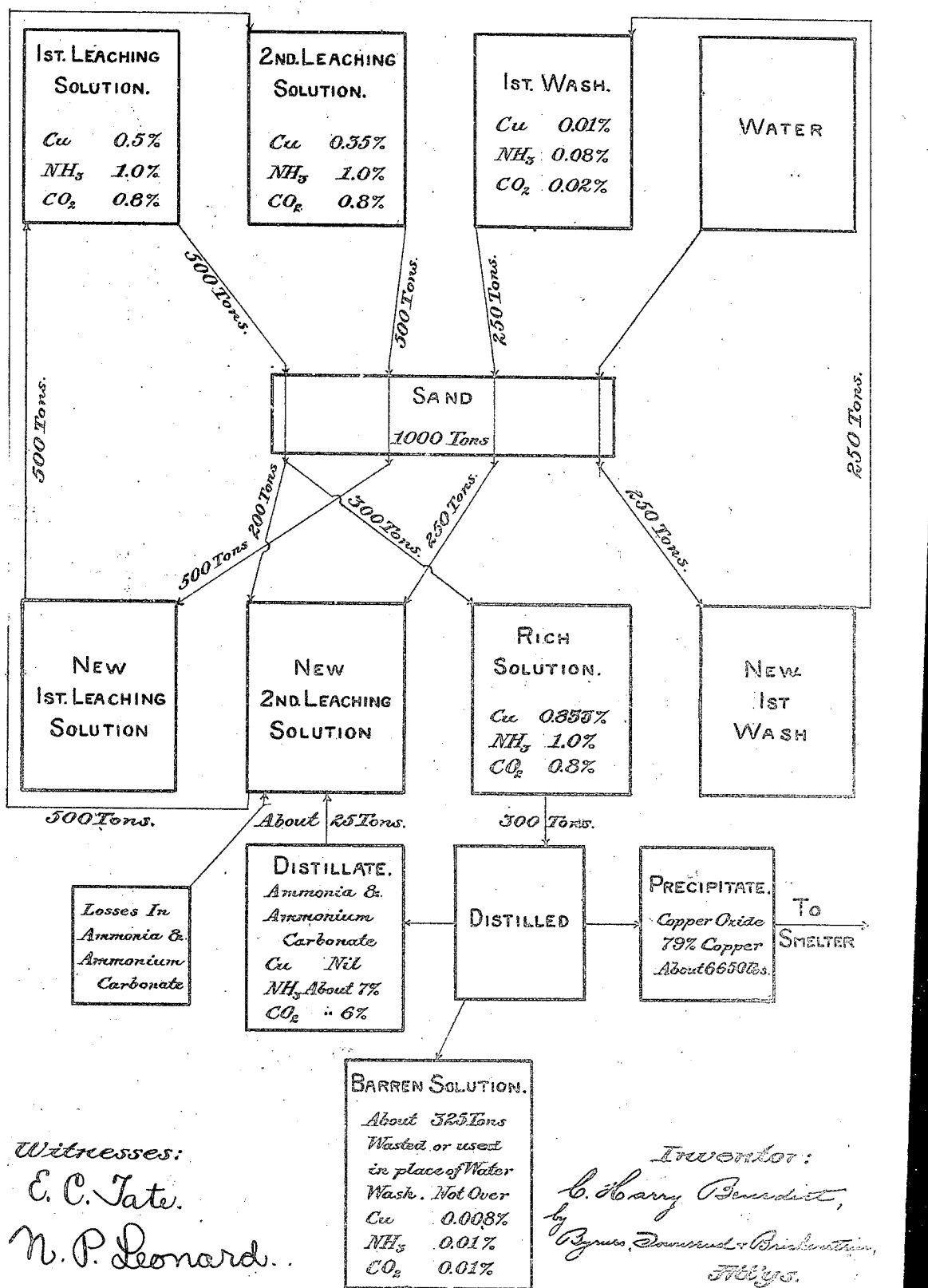

CENTENNIAL HARRY BENEDICT, OF LAKE LINDEN, MICHIGAN.

PROCESS OF EXTRACTING COPPER.

1,131,986.  Specification of Letters Patent.  Patented Mar. 16, 1915.

Application filed April 18, 1914. Serial No. 832,767.

*To all whom it may concern:*

Be it known that I, CENTENNIAL HARRY BENEDICT, a citizen of the United States, residing at Lake Linden, in the county of Houghton and State of Michigan, have invented certain new and useful Improvements in Processes of Extracting Copper, of which the following is a specification.

This invention relates to processes of extracting copper from copper-bearing sands or the like by means of dilute ammoniacal solutions of copper, the object of the invention being the provision of a cyclical process which is efficient and economical in operation, and in which the losses of ammonia and of copper are minimized.

It has long been recognized that—(1) copper oxid will dissolve in ammoniacal solutions, yielding copper-ammonium compounds; (2) solutions of cupric-ammonium salts are capable of dissolving native or metallic copper, yielding cuprous-ammonium salts; (3) these cuprous-ammonium salts may be oxidized, by air or other suitable oxidizing-agents, to cupric-ammonium salts; and (4) copper-ammonium solutions subjected to distillation, are decomposed with separation of copper oxid, ammonia being volatilized.

It has been attempted to apply ammoniacal solutions to the extraction of copper, including native copper, from its ores, but such processes have not heretofore been commercially successful, owing primarily to the heavy losses of the expensive and highly volatile ammonia, and to the high cost of the installation necessary to minimize the losses of ammonia due to volatilization from the solutions used. The present invention is designed to overcome these and other difficulties.

My investigations have shown that the losses of ammonia, which have been a very serious factor affecting the commercial success of prior processes, are not due exclusively to volatilization, as has been heretofore assumed, but arise largely from the adsorption of ammonia by the fine sands and slimes, the adsorption by slimes being greater than that by sands. I have also found that the adsorption losses are, in a general way, proportionate to the concentration of the ammoniacal solution; and that in highly dilute solutions, that is to say solutions containing two per cent. or less of $NH_3$, in the free state or in unstable combinations with copper, the adsorption losses are so small as not to interfere with the commercial aspects of the process, provided the sands are substantially free from slimes. The use of such highly dilute solutions presents the further advantage of minimizing the losses of ammonia by volatilization. It has not heretofore proven practicable to employ highly dilute solutions of this character for the extraction of copper from sands or other ores, for the reason that the solvent capacity of such solutions for copper is necessarily low as compared with that of stronger ammoniacal solutions, with the result that the volume of solution which must be handled and regenerated in order to produce a given quantity of copper has been very large, this in turn necessitating a large and costly installation.

It is a primary object of the present invention so to operate a cyclical leaching-process as to render it practicable to use these highly dilute ammoniacal solutions of copper for solvent purposes, securing thereby the advantage of small or negligible losses of ammonia and of copper, without unduly increasing the cost and size of the installation. To this end, the cycle of operations is so arranged that an amount of copper equal to that extracted from a given batch of ore will be found concentrated in a relatively small proportion of the total volume of solution brought into contact with this ore. A suitable volume of this stronger solution is subjected to distillation to precipitate its copper-content in the form of oxid, and to recover the free ammonia and any volatile ammonium salts, which are restored to the cycle at the appropriate point, the volume so distilled preferably containing an amount of copper practically equal to the total quantity of copper extracted from the ore in the same cycle.

For clearness, the following terminology is used: The terms "rich" and "poor" and "strong" and "weak" are applied to the copper-content of the various solutions in the cycle, and the terms "high" and "low"

are applied to the free ammonia-content of these solutions, all of these terms being of course merely relative.

The present process, in its preferred embodiment, involves an initial leaching-operation with a solution which, in comparison with the solutions following it in the cycle, is richer in copper and preferably lower in free ammonia. A portion of the stronger effluent from the ore is subjected to distillation, said portion containing such total quantity of copper that the quantity of dissolved copper in the circuit is maintained practically constant, that is to say, so nearly constant as to allow a repetition of the cycle: in other words, the quantity of copper recovered by the distillation is practically equal to that entering into solution from the given body of ore, the conditions being such however that this quantity of copper is derived from a relatively small proportion of the total volume of liquid traversing this ore. Under such conditions, it becomes practicable to use highly dilute leaching-solutions, without the necessity of subjecting the total volume of such solutions to a process of distillation in the course of each cycle. Following this initial treatment of the ore, it is subjected to the desired number of further extractions with solutions which are successively poorer in copper, the final solution being either water or a substantially barren solution or reject from the distillation. The second leaching-solution, being poorer in copper than the first solution, is usually somewhat higher in free ammonia; and the succeeding solutions, herein for convenience termed "washes," are not only poor or nearly free from copper but are also, preferably, successively lower in ammonia. The number of successive solutions or washes thus used will depend upon a variety of conditions as hereinafter mentioned.

The following is a typical illustrative embodiment of the process as applied to the treatment of copper-bearing sand in successive batches or bodies of approximately one thousand tons, each batch being treated with four solutions, successively applied. For simplicity, the process will be described as applied to a single batch of ore, it being of course understood that in the practical application of the invention, it is not essential to adhere strictly to the precise cycle of operations below described as illustrative of the invention.

The four typical solutions, as applied to a sand assaying approximately 0.5 per cent. of copper, in the order of their application to the sand, are designated and characterized as follows, percentages being by weight:—

(1) "First leaching solution": 0.5% Cu: 1.0% $NH_3$: 0.8% $CO_2$.

(2) "Second leaching solution": 0.35% Cu: 1.0% $NH_3$: 0.8% $CO_2$.

(3) "First wash": 0.01% Cu: 0.08% $NH_3$: 0.02% $CO_2$.

(4) "Second wash": Water, or a distillation reject containing only traces of copper and ammoniacal compounds.

It is of course to be understood that the compositions above given are illustrative only, and subject to some variation in accordance with the copper-content of the sands, and other circumstances. The first leaching solution contains ammonia, ammonium carbonate, and cupric-ammonium carbonate from a previous leaching-operation. The other solutions, as well as the first leaching solution for subsequent cycles, arise in the course of the process in the manner hereinafter indicated.

A complete representative cycle involved in the treatment of a single batch of copper-bearing sands of the character specified is indicated graphically in the accompanying diagram.

Sand finer than forty mesh, previously freed from slime by means of a Dorr classifier or otherwise, is run into a tank which for illustrative purposes may be 54 feet in diameter by 12 feet high. This tank should be covered, fitted with valve-controlled vents, provided with a false bottom of filter-cloth supported on a wooden frame and fitted with an overflow and with appropriate means for receiving and delivering the sand and the various solutions. The sand is run in with water in such manner as to be uniformly distributed. After one thousand tons of sand have been delivered to the tank, filling it with sand to a height of about ten feet, the water meanwhile overflowing, the excess water is removed by decantation and the sand drained to the surface. The first leaching solution is then led into the tank from above, the bottom valve opened, and the water displaced at as rapid a rate as filtration will permit. As soon as ammonia begins to appear at the outflow, indicating substantial displacement of the water, the lower valve is partially closed and the percolation rate adjusted as may be found necessary to secure a satisfactory solution of the copper-content of the ore. The first portions of the solution are found to be poor in copper and low in ammonia-content, owing to diffusion and imperfect displacement, and are run into the sump for the second leaching solution. Soon the first leaching solution, properly enriched in copper and now termed "rich" solution, appears and is permitted to flow to the "rich" solution tanks for subsequent distillation. This "rich" solution is the richest portion of the effluent coming from the sand, and is ready for distillation. The volume of rich solution distilled for any one batch of sand is dependent upon the copper-content of the sand, and in practice will be, on the average, such volume that the copper-content of the rich solution distilled is practically equal to the copper extracted from the sand. The rich solution on distillation breaks up into copper oxid for the smelter, ammonia and ammonium carbonate for the second leaching solution, and a reject containing traces only of copper, ammonia and ammonium carbonate; this reject may be used instead of water for the second wash, if desired.

As soon as the first leaching solution, amounting in all to some five hundred tons, has been run upon the sand and has reached the sand line, the second leaching solution is run in, in approximately equal volume; and when this in turn has all reached the sand line, the first wash is added, followed in the same manner by the second wash, the effort in all cases being to avoid mixing solutions, and to displace each by that next succeeding it in the cycle. The several effluent solutions are so manipulated as practically to maintain the proper composition balance, as between the chemical contents of the various solutions, a typical method by which this may be done being illustrated graphically in the diagram before referred to. There is thus established an equilibrium in the process, there being also a regular progression of solutions in the following general manner:—The second wash of charge N takes up a little copper and becomes the first wash of charge N+1; this in turn takes up a little more copper and receives the distillate and some dissolved copper from previous cycles and becomes the second leaching solution of charge N+2; the free ammonia of this second leaching solution is partially used in dissolving copper, when it becomes the first leaching solution of charge N+3, its copper-content having been fully oxidized to the cupric condition; this first leaching solution having become saturated with copper by its passage through the sands, and having thereby lost its solvent power, is in part distilled, as before described, depositing its copper values as a 79 per cent. oxid, yielding its ammonia and ammonium carbonate as a pure product to join cycle N+4 as a second leaching solution, and furnishing from its almost barren reject a second wash for a following cycle. In a plant containing more than one leaching-tank, these several operations are of course all going on at the same time, the total volume of solution in circulation being practically a constant: thus "rich" solution is continuously withdrawn from the leaching-circuit, and is replaced by an equal volume of second wash, less only the small volume of fresh ammonia and ammonium carbonate solution added to replace mechanical losses. In case the distillation is effected by free steam, the volume of solution is increased by its condensation, and a portion of the reject from the distillation, equal to the steam condensed, is thrown away in the course of each cycle.

The solvent power for native copper of these several solutions is of course dependent upon their content of cupric salts with the required proportion of ammonia; and theory indicates that a large amount of oxygen is required to convert the entire copper-content of the solutions to the cupric state. It has however been shown in practice that it is possible to accomplish this oxidation through the surface contact of the dilute solutions with the atmosphere, particularly after the process has reached the desired equilibrium, so that relatively large amounts of copper are being carried in solution. It is accordingly unnecessary, as a rule, in the regular operation of the process, to use any system of mechanical aeration of the several solutions. These are stored in covered tanks, with controlled vents, whereby air may be admitted as required. Means for injecting air under pressure may also be fitted both to the storage and leaching tanks. It has further been shown, in practice, that whereas there is some appreciable adsorption of ammonia by the sands, even from solutions so dilute as those contemplated under the present invention, the adsorption of copper is practically *nil;* and the losses of copper are materially reduced by the employment, as described, of at least two leaching-solutions, applied successively, the second leaching-solution being poorer in copper than the first, and both solutions being highly dilute.

Obviously, the loss due to ammonia adsorption may be somewhat lessened by repeated washings, and it is possible and may be advisable to have a "third wash" following the "second wash," the expediency of this being a commercial matter, entailing as it would an additional circuit of pipes, pumps, storage room, and the like. So, too, the balance between the amount of "rich" solution distilled and "second wash" used is in part a commercial one, depending upon the cost of steam and the distillation loss, as against the recovery of additional copper and ammonia by more complete washing.

The present process is to be distinguished from such processes as depend upon the solvent effect of ammonia, with or without aeration: in these, the entire copper-content of the effluent is derived from the ore, and it is obviously impossible to separate from any fractional portion of this effluent, less than its total volume, a quantity of copper equal to that dissolved from the ore. In other words, if a balance is to be maintained in successive cycles, the entire volume of effluent must be subjected to distillation or equivalent treatment for the recovery of copper. The present process is also to be distinguished from such as depend upon a cupric salt for their solvent effect, and precipitate from the entire volume of the effluent a weight of copper equal to the increment derived from the ore. Such processes involve the regeneration of the total volume of the effluent, without providing a barren reject; hence, if a wash is used, it must likewise at some stage of the process, be submitted to a precipitating operation, in order that it may be available for use as a wash in the succeeding cycles. In contradistinction to these, the present process yields directly from the stronger portions of the effluent a greater or less proportion of barren reject, which is available as a wash, or which may be replaced by a like volume of water available as a wash: and the volume of liquor to be distilled or otherwise treated for the separation of its copper, is limited to a portion only of the effluent instead of the total volume thereof. If the balance is to be rigidly maintained, the volume thus treated must of course contain an amount of copper equal to the increment derived from the ore; from which it follows that the volume to be distilled is smaller as the leaching-solution, before application to the ore, is richer in copper. The present process, in its preferred embodiment, renders it practicable to employ an initial leaching-solution relatively rich in copper, and thereby to reduce the volume of liquid subjected to distillation or equivalent precipitation method, to a comparatively small proportion of the total effluent: and the use of a second leaching-solution relatively poor in copper avoids the necessity, which would otherwise exist, of using large volumes of wash in order completely to remove the rich solution from the ore. In other words, the second leaching-solution, being relatively poor in copper, combines to some extent the functions of a leaching-solution and a wash; and to the extent that it combines these functions, it reduces the quantity of wash required.

It will be understood that any person skilled in the art may, with the information derived from the foregoing description, carry out my process with many variations from what I have described in detail as illustrating one embodiment thereof. Even if my described process be not employed in full, there are sundry novel features which can be utilized to advantage by those skilled in the art. I have endeavored, in the following claims, to point out the various novel features of my invention.

I claim:—

1. A cyclical process of extracting copper from copper-bearing sands or the like, which consists in subjecting a body of the sand to the successive action of a plurality of solutions, the initial solution containing a cupric-ammonium compound, removing substantially all of the copper from a portion of the stronger effluent, and re-applying the remaining solutions, as solvents, to the treatment of copper-bearing sands.

2. A cyclical process of extracting copper from copper-bearing sands or the like, which consists in subjecting a body of the sand to the successive action of a plurality of solutions, the initial solution containing a cupric-ammonium compound, removing substantially all of the copper from a portion of the effluent, the amount of copper thus removed being practically equal to the total copper extracted from the sand, and re-applying the remaining solutions, as solvents, to the treatment of copper-bearing sands.

3. A cyclical process of extracting copper from copper-bearing sands or the like, which consists in subjecting a body of the sand to the action of a plurality of dilute ammoniacal solutions containing a cupric compound, the initial solution being relatively rich in copper, removing substantially all of the copper from a portion of the stronger effluent, and re-applying the remaining solutions, as solvents, to the treatment of copper-bearing sands.

4. A cyclical process of extracting copper from copper-bearing sands or the like, which consists in subjecting a body of the sand to the action of a plurality of dilute ammoniacal solutions containing a cupric compound, the initial solution being relatively rich in copper, removing substantially all of the copper from a portion of the effluent, the amount of copper thus removed being practically equal to the total copper extracted from the sand, and re-applying the remaining solutions, as solvents, to the treatment of copper-bearing sands.

5. In a cyclical process of extracting copper, the steps which consist in subjecting the copper-bearing material to the solvent action of a plurality of dilute ammoniacal solutions each containing a cupric compound, said solutions of progressively decreasing copper-content.

6. A cyclical process of extracting copper from copper-bearing sands or the like, which consists in subjecting a body of the sand to the successive action of a cupric-ammonium leaching-solution, and a wash, recovering substantially all of the copper and ammonia from a portion of the stronger effluent, the amount of copper thus removed being practically equal to the total copper extracted from the sand, utilizing the recovered ammonia to re-constitute the leaching-solution, and applying a volume of barren liquid approximately equal to the reject from the copper-recovery process as a wash in a succeeding cycle.

7. In a cyclical process of extracting copper from copper-bearing sands or the like, the steps which consist in subjecting a body of the sand to a solution containing a cupric ammonium compound, and removing substantially all of the copper from a portion only of the stronger effluent.

In testimony whereof I affix my signature in presence of two witnesses.

C. HARRY BENEDICT.

Witnesses:
RICHARD H. NICHOLLS,
THOMAS DEARDEN.